United States Patent [19]

West, Jr.

[11] Patent Number: 5,287,539
[45] Date of Patent: Feb. 15, 1994

[54] INTERDICTION PROGRAM DENIAL SYSTEM FOR JAMMING AUDIO AND VIDEO SIGNALS

[75] Inventor: Lamar E. West, Jr., Maysville, Ga.

[73] Assignee: Scientific-Atlanta, Inc., Norcross, Ga.

[21] Appl. No.: 483,451

[22] Filed: Feb. 21, 1990

Related U.S. Application Data

[63] Continuation-in-part of Ser. No. 166,302, Mar. 10, 1988, Pat. No. 4,912,760.

[51] Int. Cl.$^5$ .............................................. H04K 3/00
[52] U.S. Cl. .......................................... 455/1; 455/6.2; 455/26.1; 380/10; 380/19; 348/6
[58] Field of Search ............ 455/1, 6.1, 6.2, 26.1; 358/86, 349; 380/8-10, 19

[56] References Cited

U.S. PATENT DOCUMENTS

| | | | |
|---|---|---|---|
| 3,760,097 | 9/1973 | Burroughs et al. | 455/1 |
| 3,896,262 | 7/1975 | Hudspeth et al. | 455/1 |
| 3,989,887 | 11/1976 | Murphy | 455/1 |
| 4,039,954 | 8/1977 | den Toonder | 455/1 |
| 4,074,311 | 2/1978 | Tanner et al. | 358/118 |
| 4,085,422 | 4/1978 | Niwata et al. | 358/118 |
| 4,148,064 | 4/1979 | Reed | 358/118 |
| 4,222,067 | 9/1980 | Stern et al. | 358/118 |
| 4,317,213 | 2/1982 | DiLorenzo | 455/1 |
| 4,334,322 | 6/1982 | Clark, III | 455/62 |
| 4,342,119 | 7/1982 | Seidl | 455/1 |
| 4,343,042 | 8/1982 | Schrock et al. | 455/5 |
| 4,367,557 | 1/1983 | Stern et al. | 455/4 |
| 4,434,436 | 2/1984 | Kleykamp et al. | 358/118 |
| 4,450,481 | 5/1984 | Dickinson | 358/114 |
| 4,498,193 | 2/1985 | Richardson | 455/1 |
| 4,636,852 | 1/1987 | Farmer | 358/120 |
| 4,651,204 | 3/1987 | Uemura | 380/7 |
| 4,682,359 | 7/1987 | Mistry | 380/7 |
| 4,737,990 | 4/1988 | Kaneko | 380/7 |
| 4,748,667 | 5/1988 | Farmer et al. | 380/7 |
| 4,769,838 | 9/1988 | Hasegawa | 380/7 |
| 4,792,971 | 12/1988 | Uemura | 380/7 |
| 4,825,467 | 4/1989 | Rist et al. | 380/7 |
| 4,825,468 | 4/1989 | Ellis | 380/7 |
| 4,837,820 | 6/1989 | Bellavia, Jr. | 380/7 |
| 4,841,569 | 6/1989 | Wachob | 380/7 |
| 4,903,297 | 2/1990 | Rist et al. | 455/1 |
| 4,912,760 | 3/1990 | West, Jr. et al. | 455/1 |
| 4,914,695 | 4/1990 | Martin | 380/7 |
| 4,991,206 | 2/1991 | Blais | 455/1 |
| 5,014,309 | 5/1991 | West, Jr. | 455/1 |

FOREIGN PATENT DOCUMENTS

| | | |
|---|---|---|
| 178758 | 4/1986 | European Pat. Off. |
| 360778 | 9/1989 | European Pat. Off. |
| 59-61384 | 4/1984 | Japan |

OTHER PUBLICATIONS

"TGT-The Affordable Solution" by AM Cable TV Industries, Inc., May 1987.
"Addressable Tap IT-1-SM" by Control Com Inc., Sep. 1982.
"Tier Guard" System by E-Com Corporation.

Primary Examiner—Reinhard J. Eisenzopf
Assistant Examiner—Andrew Faile
Attorney, Agent, or Firm—William A. Marvin; Frederick W. Powers, III

[57] ABSTRACT

Off premises cable television interdiction apparatus comprises a microprocessor actuation and control means for actuating and controlling at least one frequency agile voltage controlled oscillator. The voltage controlled oscillator selectively jams only unauthorized premium programming transmitted in the clear from a headend to a particular subscriber. The voltage controlled oscillator generates a jamming signal carrier at a frequency 1/N between the video and audio carriers where N is an integer, preferably small. The microprocessor provides a calibration mode and a normal mode of operation. During the normal mode of operation, a frequency hopping rate on the order of four thousand hertz is achievable. the method of interdiction comprises the steps of generating and storing voltage control words for operating the oscillator consistent with a headend selected jamming factor for a particular channel to be jammed and addressably transmitted and stored premium programming authorization data.

36 Claims, 6 Drawing Sheets

INTERDICTION PROGRAM DENIAL SYSTEM FOR JAMMING AUDIO AND VIDEO SIGNALS

CROSS-REFERENCE TO RELATED APPLICATION

This application is a continuation-in-part of U.S. patent application Ser. No. 166,302, now U.S. Pat. No. 4,912,760 filed Mar. 10, 1988 entitled "Off-Premises Cable Television Channel Interdiction Method and Apparatus." Reference is also made to commonly owned pending applications U.S. patent application Ser. No. 446,602, U.S. Pat. No. 5,142,574, entitled "Optimum Amplitude and Frequency of Jamming Carrier in Interdiction Program Denial System," filed Dec. 6, 1989, and U.S. patent application Ser. No. 476,041, entitled "Interdiction Method and Apparatus With Variable Dwell Time," filed Feb. 6, 1990.

BACKGROUND OF THE INVENTION

1. Technical Field

This invention relates to cable television systems and, more particularly, a method and apparatus for applying remotely controlled and remotely applied interdiction or jamming signals to prevent reception of unauthorized television channels.

2. Description of the Prior Art

At a headend of a cable television system, a scrambler is normally provided to encode premium television channels. The applied scrambling precludes reception by an unauthorized converter/decoder at a connected premises. Data representing channels or tiers of programming are addressably transmitted to a particular converter/decoder and stored in an authorization memory. As a result of the addressed transmission, a subsequently transmitted program is authorized in that the decoder portion of the converter/decoder will be selectively enabled to decode the scrambled premium channel or program.

Several varieties of scrambling techniques are applied today. Each manufacturer has its own scheme which maybe incompatible with others. Nevertheless, most popular scrambling systems today are on sync suppression, in which the sync information is hidden from the television receiver's sync separator, usually by moving it to a level occupied by picture information (moving the sync tip to an equivalent picture level of 40 IRE units is common). Some systems modulate the video carrier with a sine wave phased to suppress the horizontal blanking interval. Most systems today switch to the suppressed level at the beginning of the blanking interval and switch out at the end. Most though not all suppress the vertical blanking interval. Some systems dynamically invert the video, either on a line-by-line or a field-by-field basis. This must be done carefully to avoid artifacts caused by inverting and reinverting around different levels, and by differential gain and phase of the system. Synchronization is restored either by the provision of synchronous amplitude modulated pulses on the audio carrier, by digital information placed in the vertical interval or by phase modulation on the video carrier.

The provision of one scrambler per premium channel at the headend and the inclusion of a descrambler in each converter/decoder at the premises of the television receiver is particularly expensive. Furthermore, providing the converter/decoder on premises has turned out to be a great temptation to service pirates who imaginatively seek ways to receive premium channels. As a result, cable television equipment manufacturers have entered into a veritable war with such pirates resulting in complicated service authorization protocols in some instances involving multiple layers of encryption by both in-band and out-of-band data transmission further increasing the costs of the converter/decoder.

Furthermore, all scrambling systems leave artifacts in the horizontal blanking interval in the form of steps on the front and back porches. Normally these are not a problem, but if a television receiver does not have adequate overscan, then the steps can show up as light bars on one or both sides of the picture. Further, if a television receiver uses back porch sampling for automatic gain control and/or black level restoration, and the sampling period extends into the time of the descrambling step, the television will show the wrong level and may show flicker in the picture. In systems in which pulse trains are applied to the audio carrier, a buzz carried by harmonics of a 59.94 Hz signal can be noticed in some television receivers.

Consequently, the cable industry has resorted to look for new technology and to take a second look at technology developed in the early stages of development of cable television such as the application of negative and positive traps and more recent techniques such as interdiction.

Negative trap technology is viewed by many manufacturers as a viable alternative to sync suppression scrambling methods. A negative trap is basically a narrow band reject filter. Traps are located at the drop to a subscriber's dwelling and attenuate a significant portion of a premium television channel rendering that channel unusable by the subscriber.

In the conventional embodiment, negative traps are made using L-C filter techniques. The result is a notch with finite quality Q and finite shape factor. In the case of a single channel negative trap, the center of the notch is usually located at the video carrier frequency of the channel to be removed. This technique, sometimes called a static negative trap, requires attenuation at the video carrier of at least 60 dB to be effective.

Negative trap systems have several advantages that make them attractive for cable television applications. One primary advantage is the ability to deliver a broadband cable television spectrum to the subscriber's converter/decoder. Conventional sync suppression systems utilize descrambling set-top converter/decoders which deliver inherently narrowband signals. Negative traps are usually mounted outside the subscriber's home (typically at the tap) and thereby minimize the exposure associated with placing hardware inside the subscriber's dwelling. Finally, some cable television operators view the negative trap as a more secure means of subscriber control than is sync suppression, as picture reconstruction is viewed as substantially more difficult.

However, the negative trap system requires hardware in locations where no revenue is generated for the cable television system. Moreover, negative traps have several severe practical limitations. L-C band reject filters have Q and shape factor limitations. Quality factors Q for L-C filters are typically limited to less than 30. This means that for a negative trap located at channel 8 (video carrier at 181.25 MHz) the 3 dB bandwidth of a negative trap is typically 6 MHz (or the bandwidth of a baseband television channel). This trap would result in significant deterioration of the lower adjacent channel. Then the television receiver tuned to the lower adjacent channel, rather than having to contend with a 15 dB picture-to-sound ratio, may have to contend with a audio carrier reduced an additional 6 dB or so. Frequency stability as a function of time and temperature is also a significant concern. Many cable television system operators have instituted a regular negative trap change-out program based on the assumption that after a certain period of time and temperature cycling, frequency drift will render negative traps useless.

Cascadability is another significant concern. Finite return loss and non-zero insertion loss limit the number of single channel negative traps which can be cascaded. As the number of services to be secured increases, the negative trap decreases in appeal. Moreover, a change in a channel line-up requires a significant investment in hardware and manpower in this scenario.

Recently, a new type of negative trap has been introduced. The dynamic negative trap consists of a notch filter that is designed to be modulated with respect to frequency. The notch is centered about the video carrier but is deviated slightly from side to side. The television channel is rendered unusable by the introduction of unwanted amplitude and phase modulation on the video carrier. This technique requires a notch depth significantly less than that of static negative traps (typically 40 dB). Additionally, the intentionally introduced frequency modulation reduces somewhat the requirement for frequency stability.

The dynamic negative trap, however, has several disadvantages. A power source is required in order to accomplish the frequency modulation. More significant is the parasitic modulation that this technique produces on the adjacent television channels.

Positive trap systems also utilize a narrow band-rejection notch filter. However, unlike negative trap systems which are used to attenuate or trap a premium channel transmission, the notch filter is used to restore the premium television channel. In this scenario, an interfering signal is placed inside the premium television channel at the cable television headend. This interfering signal is then removed at the subscriber's dwelling by use of the notch filter. Ideally this notch filter removes only the interference without removing a significant amount of television information.

The positive trap technique is seen as having several advantages by the cable television system operator. It is considered advantageous to have the interference present in the secured channels on the cable television distribution plant (unlike the negative trap system in which the channels to be secured are "in the clear" on the distribution plant). It is very attractive from a financial standpoint to require subscriber hardware only at those locations where a subscriber wishes to receive a secure service. Thus, any capital investment is associated with a point of revenue generation.

The conventional embodiment of the positive trap system utilizes L-C notch filters to remove the interfering signal. These L-C notch filters suffer from the same limitations as do L-C negative traps discussed above. Consequently, L-C based positive traps are limited to the lower end of the cable television spectrum. Quality Q and shape factors have also restricted the number of locations for the interfering signal within the television channel.

One such positive trap system is described in U.S. Pat. No. 4,074,311, issued Feb. 14, 1978 to Tanner et al. Tanner teaches locating the interfering signal of the positive trap system midway between the video carrier and audio carrier. The energy density (and hence information density) in this area of the spectrum is relatively low. One reason this location was chosen was that it minimized the impact of any television information removed along with the interfering signal by the notch filter, and thereby improved the quality of the recovered television signal. It would be expected that the jamming carrier would normally have minimal effect on the adjacent channel television picture unless a television has unusually poor rejection 2.25 MHz above the video carrier. The jammer does add another carrier which the tuner will have to contend with, which might cause some degradation in a marginally overloaded case.

Despite this location, the quality Q and shape factor limitations of conventional L-C positive traps do remove a significant amount of useful television information. The result is a noticeable "softening" of the television picture as a result of attenuation of high frequency information. Predistortion at the headend can improve this performance but falls far short of being able to correct it completely. This location for the interfering signal also facilitates the job of the video pirate. This pirate can easily tolerate a degraded signal and hence can recover a usable picture using techniques easily available (such as the classic twin lead quarter wave stub with an aluminum foil slider for the fine tuning). In addition, since the frequency of the interfering signal frequency is relatively stable, a pirate need only construct his own LC notch filter (or obtain an LC notch filter stolen from a subscriber's residence) to pirate the premium channel signal. As disclosed by Tanner, the LC notch filter is a completely passive device which does not provide for dynamic or head-end controlled scrambling.

A relatively recent technique for premium channel control is the interdiction system, so-called because of the introduction of an interfering signal at the subscriber's location. One embodiment consists of a pole-mounted enclosure located outside the subscriber's premises designed to serve four or more subscribers. This enclosure contains at least one microprocessor controlled oscillator and switch control electronics to secure several television channels. Control is accomplished by injecting an interfering or jamming signal into unauthorized channels from this pole-mounted enclosure.

For efficiency's sake, it is known to utilize one oscillator to jam several premium television channels. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

One such system is known from U.S. Pat. No. 4,450,481 in which a single frequency agile oscillator provides a hopping gain-controlled jamming signal output to four high frequency electronic switches. In this known system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal at approximately the same frequency has been superimposed.

In the known system, it is indicated that sixteen channels may be jammed by a single voltage controlled frequency agile oscillator. With respect to one premium channel, this translates to a situation in which the jamming signal can only be present one sixteenth of the time or an approximately 6% jamming interval. The rate of hopping is also indicated at 100 bursts per second of jamming signal at a particular frequency or a 100 hertz hopping rate. Consequently, the effectiveness of the jamming signal is questionable.

Cable television channels and, of course, premium service may extend over a wide range of frequencies, for example, from 100 to 350 megahertz. In the known system, the single oscillator provided must be frequency agile over a wide range. It is further recognized that the jamming signal output of the single oscillator must be within a range of 100-500 KHz above or below the video carrier frequency. Consequently, a synthesizer having an internal reference is provided to assure the reasonable accuracy of the jamming signal output of the oscillator to a tolerable 100-500 KHz band above or below the video carrier.

It is indicated that the jamming signal is at a high relative power and is gain controlled to exceed the amplitude of the video carrier by 5 to 20 dB. Because of the high output power relative to the premium channel video carrier power and the difficulty of precisely jamming the premium channel frequency, such an interdiction system leaves considerable opportunity for improvement. Because the oscillator is frequency hopping, its spectrum tends to spread out around the video carrier, generating a slightly different situation as far as the required adjacent channel rejection characteristics of the television signal are concerned.

Jamming oscillators usually operate near the video carrier frequency of the television signal and preferably at an amplitude near the amplitude of the television signal. Should the amplitude of a jamming oscillator be too low with respect to the amplitude of the video carrier, inadequate jamming of the channel may occur resulting in a recoverable video by the subscriber. On the other hand, should the amplitude of a jamming oscillator be too high with respect to the amplitude of the video carrier, artifacts may be generated in unsecured adjacent television channels. Such is also the case when the frequency of a jamming oscillator varies from the video carrier frequency of a channel to be jammed.

It had been considered important in an interdiction system that the jamming signal frequency be placed as close as possible to the video carrier frequency. Otherwise, adjacent channel artifacts or incomplete jamming may result. In the known system, the jamming signal is intentionally placed below the video carrier and consequently approximate to an adjacent channel producing adjacent channel artifacts.

It is also important that a variable frequency oscillator in an interdiction system hop between frequencies quickly and accurately with little harmonic frequency effects. Otherwise, adjacent channel artifacts or incomplete jamming will result. Furthermore, by using only one jamming oscillator, only a limited, small number of channels may be jammed. The known system uses a conventional voltage controlled oscillator controlled by conventional frequency control techniques. Furthermore, in the known system, a maximum six percent jamming interval results when sixteen premium channels are jammed by the single oscillator at a relatively slow rate of frequency hopping. In such a system, the result depth of jamming for an unauthorized premium channel is unsatisfactory.

Additionally, it is important in an interdiction system that the jamming signal be properly matched in gain with the level of an interdicted channel. Furthermore, it is important that gain of a jamming oscillator match the level of an interdicted channel not only to compensate for drifts in the components due to temperature variations and seasonal weather changes but to compensate for level variations due to its location in a television distribution plant and to compensate for tilt due to imperfect gain requirements of a distribution cable over the frequency spectrum. Otherwise, adjacent channel artifacts or incomplete jamming will result. In the known system, conventional gain sensing and control circuits are used for gain control to compensate only for the simplest of variations.

In the prior art system, the jamming frequency is controlled to place the interference as close as possible to the video carrier to maximize jamming of the video signal. Jamming of the audio carrier is either not considered or is of secondary consideration. In TV sets using an intercarrier mixer or detector to regenerate the video carrier, a jamming carrier placed within a few hundred kilohertz of the video carrier will effectively jam both the audio and video signals. However, some modern television sets use a synchronous detector with PLL circuitry to regenerate the video carrier. In these sets, the synchronous detector removes the jamming carrier from the audio signal, and only the video portion will be jammed.

For some premium channels, it may be particularly desirable to jam the audio as well as the video. Music video channels, for instance, are still of use to an unauthorized subscriber if only the video portion is jammed. With other premium channels, jamming of both the audio and video portions may also be desired. For example, when jamming so-called "adult" channels, it may be preferable to jam both the video and audio portions so that unauthorized subscribers cannot see or hear the program and so that those who find such programming distasteful are not offended by any such programming while scanning through the channels.

One solution to provide audio jamming would be to select the audio carrier frequency of the channel to be jammed as one of the jamming frequencies to be selected by the oscillator when frequency hopping. This approach has two drawbacks. First, the jamming signal would have to be attenuated approximately 15 db when jamming an audio carrier frequency, otherwise the jamming signal would produce interference on adjacent channels (adjacent channel interference). In order to attenuate the jamming signal for audio jamming, additional hardware would be necessary to control the amplitude of the jamming signal when switching from video to audio jamming. Even if the amplitude of the jamming signal could be effectively controlled, the process of hopping from one frequency to another effectively adds amplitude modulation to the jamming carrier, adding a structure of energy in sidebands surrounding the jamming carrier. At least a portion of the sideband energy may fall in the upper adjacent channel spectrum, causing interference even if the amplitude of the jamming signal has been reduced. Second, by jamming the audio carrier, the video carrier may not be effectively jammed. In order to jam both audio and video carrier, the oscillator would have to jam both carriers separately while frequency hopping. As a result, some audio or video signals can get through and the number of channels that may be jammed by a particular oscillator may be reduced by a factor of two which may be undesirable or unacceptable.

Consequently, prior to the present invention, the need remained for an interdiction system capable of effectively jamming both audio and video carriers on all types television sets in a cost effective manner without producing adjacent channel artifacts or ineffective video jamming. The present invention solves the above-mentioned problems and provides an interdiction system with improved audio and video signal jamming techniques not heretofore possible.

SUMMARY OF THE INVENTION

Many of the above-stated problems and related problems of the prior art have been solved with the principles behind the present invention, a television channel interdiction method and apparatus capable of remotely controlled jamming depth and frequency at reduced power. After considerable investigation into the known art and through experimentation, it has been determined that an optimum placement of a jamming signal for jamming both audio and video portions at a frequency substantially equal to the sum of the video carrier frequency and a fraction 1/N of the difference between the video and audio carrier frequencies where N is an integer, preferably small. Such a placement is between the video carrier and the audio carrier for the same premium channel. A ten bit voltage control word is applied by way of a digital to analog converter to a voltage controlled oscillator to control the frequency of the jamming signal within this frequency range.

In the preferred embodiment, the jamming signal may be optionally assigned during one or more of its jamming time slots to a frequency halfway between the video and audio carriers (i.e. N = 2). At this frequency, the video carrier is still jammed by the jamming signal. Thus, a combination of jamming at or near a frequency near the video carrier frequency alone and at a frequency halfway between the video and audio carrier frequencies at another time slot serves to enhance the picture obfuscation and provide audio jamming compared to jamming at the video carrier frequency at only one time slot. The reason the audio carrier is jammed is that, in the process of performing the intercarrier detection function, the difference frequency between the video and jamming carriers (in this instance ½ of 4.5 MHz = 2.25 MHz) is doubled by the distortion in the mixer, with the second harmonic of the difference falling on the sound carrier.

In addition to jamming the audio carrier, this technique enhances the picture jamming by placing the jamming signal near the video carrier during one time slot and between the video and audio carriers at another time slot. This makes a would-be pirate's job more difficult as one would have to find a way to eliminate energy not only near the video carrier, but also at additional frequencies in the channel (½, ⅓, ¼. . . . 1/N, etc. between the video and audio carriers). This job becomes even more difficult if the frequencies are also allowed to drift.

The technique may be further extended to allow enhanced jamming at any frequency in the TV channel. The preferred frequencies would lie from approximately 100 KHz below the video carrier to frequencies between the video and audio carriers. Absent a desire to jam the audio carrier, this would make life more difficult for a pirate by forcing him to develop apparatus for removing jamming energy at any frequency within the band of frequencies making up the channel. Since the frequency of the jamming oscillator can be changed from the headend via the addressable link, the system can be reconfigured with jamming carriers placed in different locations within the channel. This assignment can even be made dynamic in order to thwart a pirate.

In addition, the jamming process can be further enhanced by placing the jamming carrier at different frequencies within a particular channel at different times. Further, the location of the jamming carrier can be changed randomly or pseudo-randomly either by the headend, or by the off-premises module.

Furthermore, to insure the accuracy of the frequency of the jamming signal and to limit jamming signal frequency harmonic interference, a plurality of oscillators may be provided, each operating within a particular narrow band of the cable television spectrum. The sum of all such narrow bands should be equivalent to the entire spectrum over which jamming is desired, recognizing that the cable television spectrum to be jammed may itself be discontinuous or that some overlap in bands may be desired. Each oscillator may be intentionally limited to jamming a maximum of four channels within its band resulting in approximately a factor of four improvement in jamming interval over the prior art. Furthermore, each plurality of oscillators is provided on a per subscriber or per drop basis.

These advantages and features of the present method and apparatus for providing the improved interdiction system for selectively jamming a plurality of channels on a broadband signal under control from the headend will now be explained in the following detailed description of the invention with reference to the drawings.

DETAILED DESCRIPTION OF THE INVENTION

Figure 1:
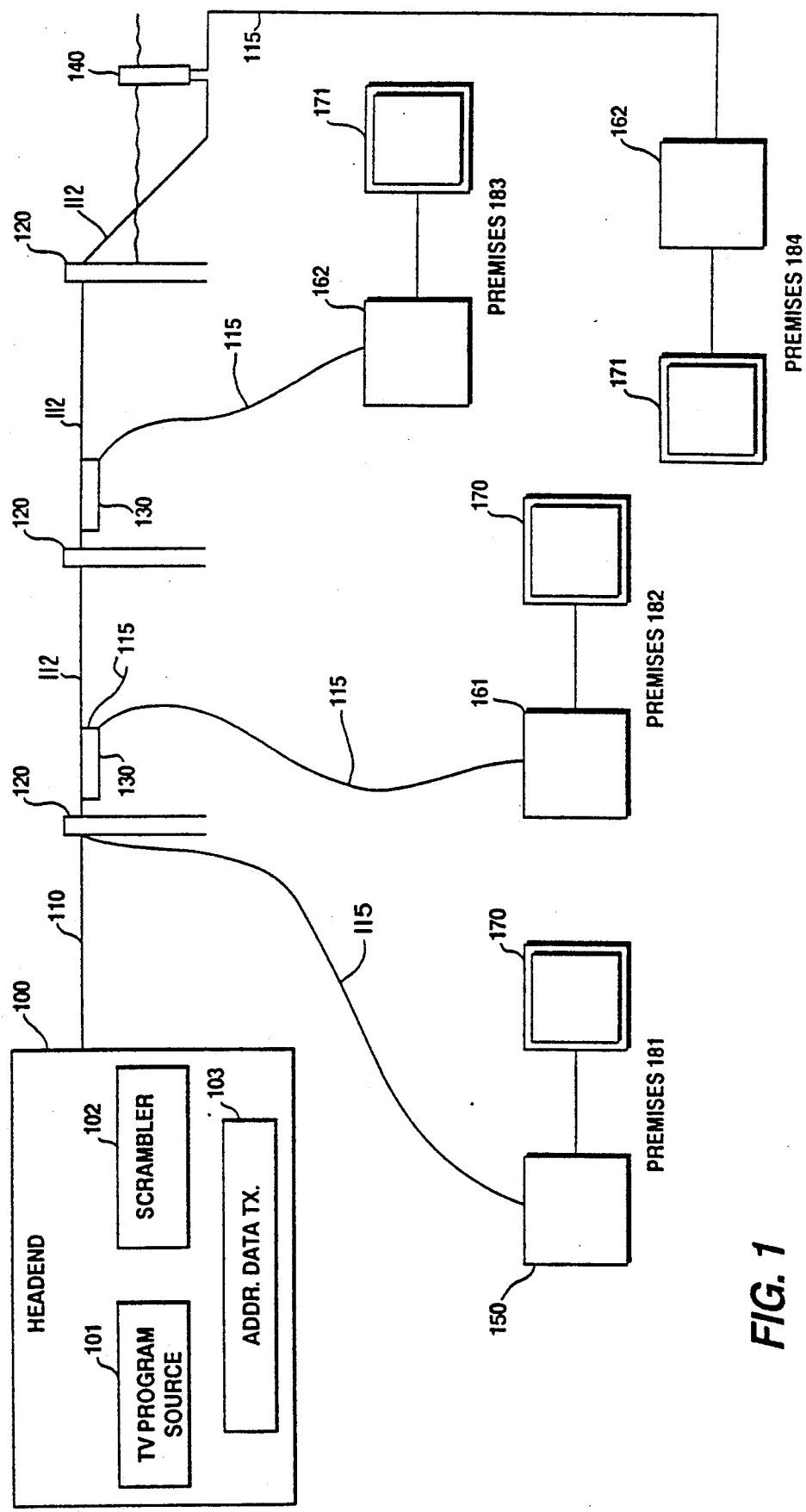
FIG. 1 is an overall system block diagram showing the inherent compatibility of the present interdiction apparatus with existent cable television systems comprising premium channel scramblers, addressable data transmitters, and subscriber converter/decoders.

Referring particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver, may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commercial user of the cable television system. Headend 100 as used in the present application and claims is defined as the connecting point to a serving cable or trunk 110 for distributing television channels over feeder line 112 to drop 115 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal at baseband is generally considered in the following description; however, the principles of the present invention apply equally to other standard and non-standard baseband television signal formats.

Headend 100 comprises a source of television programming 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 110 and subsequently over feeder line 112 and drop line 115.

Conventionally, trunk line 110, feeder line 112, and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured is generally scrambled by scrambler 102 provided at headend 100. By the use of the term premium channel or premium programming in the present application and claims is intended a channel or program which is desired to be secured from unauthorized receipt either because of its premium or restricted status.

Normally, all premium programming in known cable television systems is scrambled. However, in accordance with the present invention, premium programming is transmitted in the clear, and interdiction is applied at interdiction apparatus 130 to prevent reception of unauthorized premium programming.

Consequently, during a transition period in which headend 100 provides scrambled television programming as well as premium programing in the clear, a scrambler 102 will be provided so long as converter/decoders 150 are provided to subscribers for unscrambling scrambled program transmission. In certain instances, converter/decoders 150 may be entirely replaced by interdiction apparatus 130 of the present invention.

Also, at the headend, there is normally an addressable data transmitter 103 for transmitting global commands and data to all subscribers or addressed communications for reception by a unique subscriber. Such data transmission may be conducted over a separate data carrier from the cable television spectrum, for example, at 108.2 megahertz. It may also be transmitted over an unused default channel from the television spectrum. Global commands generally take the form of operation code and data while addressed communications further comprise the unique address of a particular subscriber.

In another alternative embodiment, such communications may take the form of in band signals sent with a television channel superimposed upon an audio carrier during, for example, the vertical interval of the video signal. Such data communications further complicate data reception at intervention apparatus 130 in accordance with the present invention and are desirably eliminated. However, in band signaling is sometimes required for the operation of certain converter/decoders 150 known in the art.

Consequently, headend 100, cable television serving cable or trunk line 110, and converter/decoders 150 and television receivers 170 at a typical subscriber premises 181 comprise a typical known cable television system. Channel program or authorization data is transmitted via an addressable data transmitter 103 over a trunk line 110 on feeder line 112. At a pole 120 or from a pedestal 140 at underground cable locations, the serving signal is dropped via drop 115 to a subscriber location. Drop 115 is connected to a conventional converter/decoder 150 which serves several functions. Responsive to an addressed communication from headend transmitter 103, channel or program authorization data is updated in an authorization memory if the address associated with the addressed communication matches a unique address of the subscriber decoder 150. For example, the subscriber address may comprise a plurality of bits over and above the actual number of subscribers in a system, additional bits insuring the security of the address. The premium channel or program is then stored in the authorization memory of the converter/decoder 150. Television programming is normally converted to an otherwise unused channel such as channel 3 of, 4 of the television spectrum by a converter portion of converter/decoder 150. Its premium status is checked against the data stored in authorization memory. If the programming is authorized, the decoder portion of the converter/decoder is enabled to decode authorized scrambled premium programming.

The provided television receiver may be a conventional television receiver 170 or may be a so-called cable ready television receiver 171. Because of the advent of cable ready television receivers 171, there is no longer a requirement at a subscriber premises 181 for the converter portion of the converter/decoder 150 as a converter is built into such television receivers.

In accordance with a cable television system provided with interdiction apparatus 130 of the present invention, a housing is mounted on a strand supporting cable 112, to a pole 120, or provided via a pedestal 140. Inside the housing is common control circuitry for tapping into the broadband television and data transmission spectrum. Referring to the first pole 120 from the left of FIG. 1, there is shown a strand-mounted apparatus serving two drop 115 to subscribers. Altogether, four subscribers and up to four drops 115 may be served by interdiction apparatus 130. Besides the common control circuitry, four plug-in subscriber modules may be provided for one housing. Also, if desired, additional services may be provided via other plug-in units of the housing such as impulse pay-per-view, subscriber polling involving two-way data communication, meter reading, energy management or other services.

Desirably, all equipment 161 may be removed from the subscriber premises 182. However, for the provision of additional services, some on-premises equipment may be unavoidable. For purposes of this description, premises 182 will be assumed to include at least one noncable ready conventional television receiver 170. Consequently, subscriber equipment 161 must at least comprise a tunable converter for converting a received cable television channel to an unused channel such as channel 3 or 4 for reception on conventional television receiver 170.

Power for interdiction apparatus 130 may be provided over the cable from the headend 100 or be provided via the subscriber drop 115 or by a combination of such means. Foreseeably, power may be even provided by rechargeable means such as solar cells or other external or replaceable internal sources such as batteries. Consequently, subscriber equipment 161 may also comprise a source of power for interdiction apparatus 130.

Interdiction apparatus 130 may be secured in a tamper-resistant housing or otherwise secured such as in a locked equipment closet of an apartment complex. If Located in a place exposed to the elements, the housing should be water-tight. Also, the housing should be designed to preclude radio frequency leakage.

At premises 183, the subscriber is presumed to have a cable ready television receiver 171. Consequently, subscriber unit 162 may be entirely eliminated or comprise simply a power feed to interdiction apparatus 130.

Premises 184 pictorially represents a subscriber location served by an underground cable 110 via a plurality of pedestals 140, in which cable distribution amplification and branching equipment and drops 115 are normally provided. In accordance with the present invention, pedestal 140 may comprise an off-premises housing for interdiction apparatus 130. Subscriber equipment 162 may comprise a converter, an additional service device and a power unit as described in reference to subscriber equipment 161 or nothing at all as described in reference to subscriber equipment 162.

Interdiction apparatus 130 is uniquely addressable by headend 100 just as is converter/decoder 150. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form in accordance with the principles of the present invention. Nevertheless, address security may be desirable so long as converter/decoders 150 or other unique address requisite equipment is provided at a premises.

Interdiction apparatus 130 comprises addressable common control circuitry and up to four plug-in subscriber modules. Upon receipt of subscriber specific premium program or channel authorization data, the data are stored at interdiction apparatus 130. Interdiction apparatus 130 further may comprise automatic gain control circuitry for the common control circuitry. Channel interdiction circuitry associated with each subscriber module jams unauthorized premium programming dropped via a particular drop 115 to a particular subscriber. Consequently, interdiction apparatus 130 is reasonably compatible with addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly times jamming signal placed at a varying frequency or seek to tamper with the off-premises apparatus 130 or derive a signal from shielded and bonded cable 110 which should likewise be maintained secure from radio frequency leakage.

Figure 2:
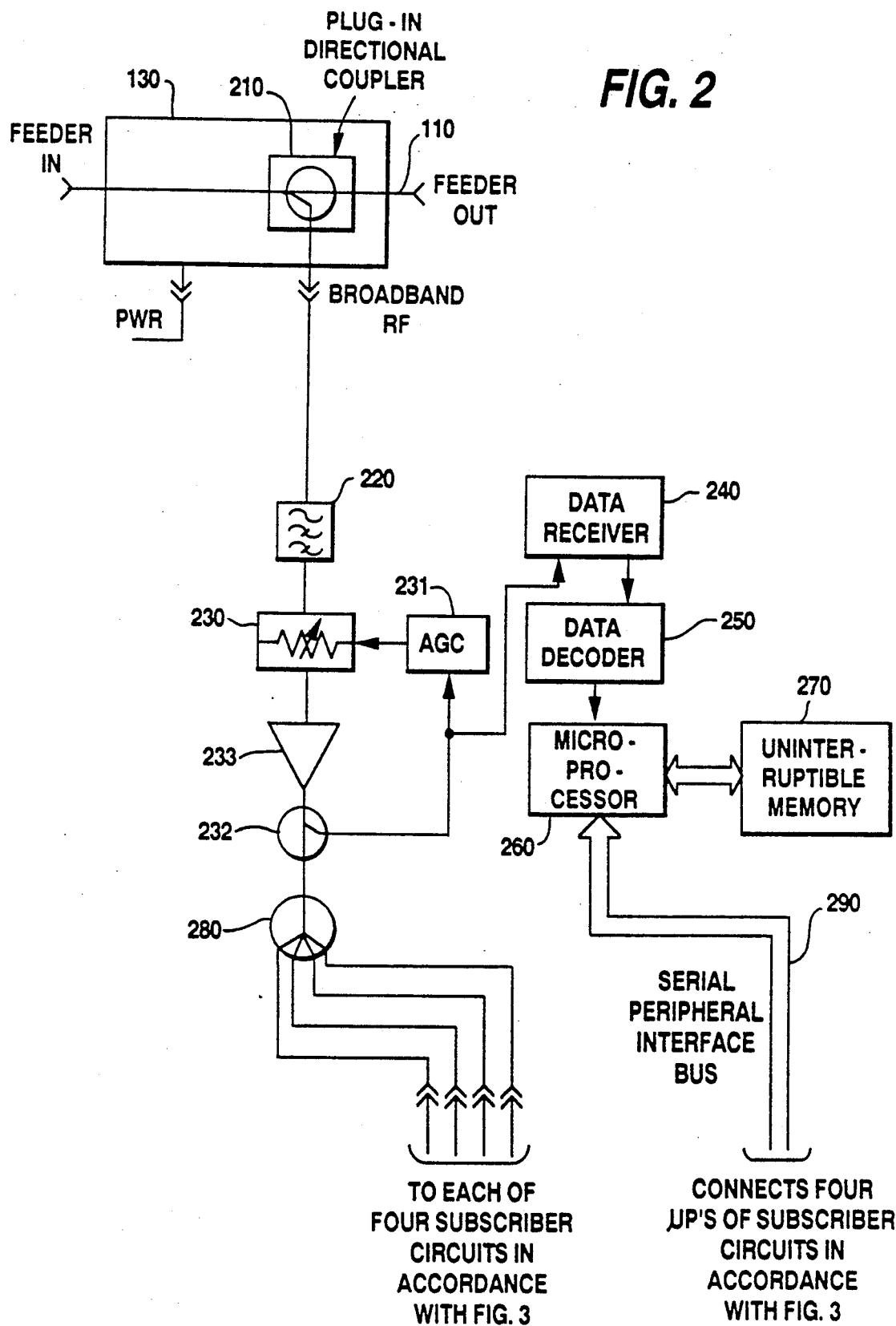
FIG. 2 is a block schematic diagram of an addressable common control circuit for the plurality of provided subscriber modules in accordance with the present invention comprising a broadband signal tap, a microprocessor, a data receiver and decoder and an automatic gain control circuit.

The common control circuitry of interdiction apparatus 130 will now be described by means of the block diagram FIG. 2 for serving four subscriber modules in accordance with the block diagram FIG. 3. Referring particularly to FIG. 2, a feeder cable 110 is shown entering interdiction apparatus 130 at FEEDER IN and leaving at FEEDER OUT. Power PWR may be provided via the feeder cable by means of a subscriber drop or locally by internal or external means. Depending on the source of power PWR, input power may be of alternating or direct current.

Figure 4:
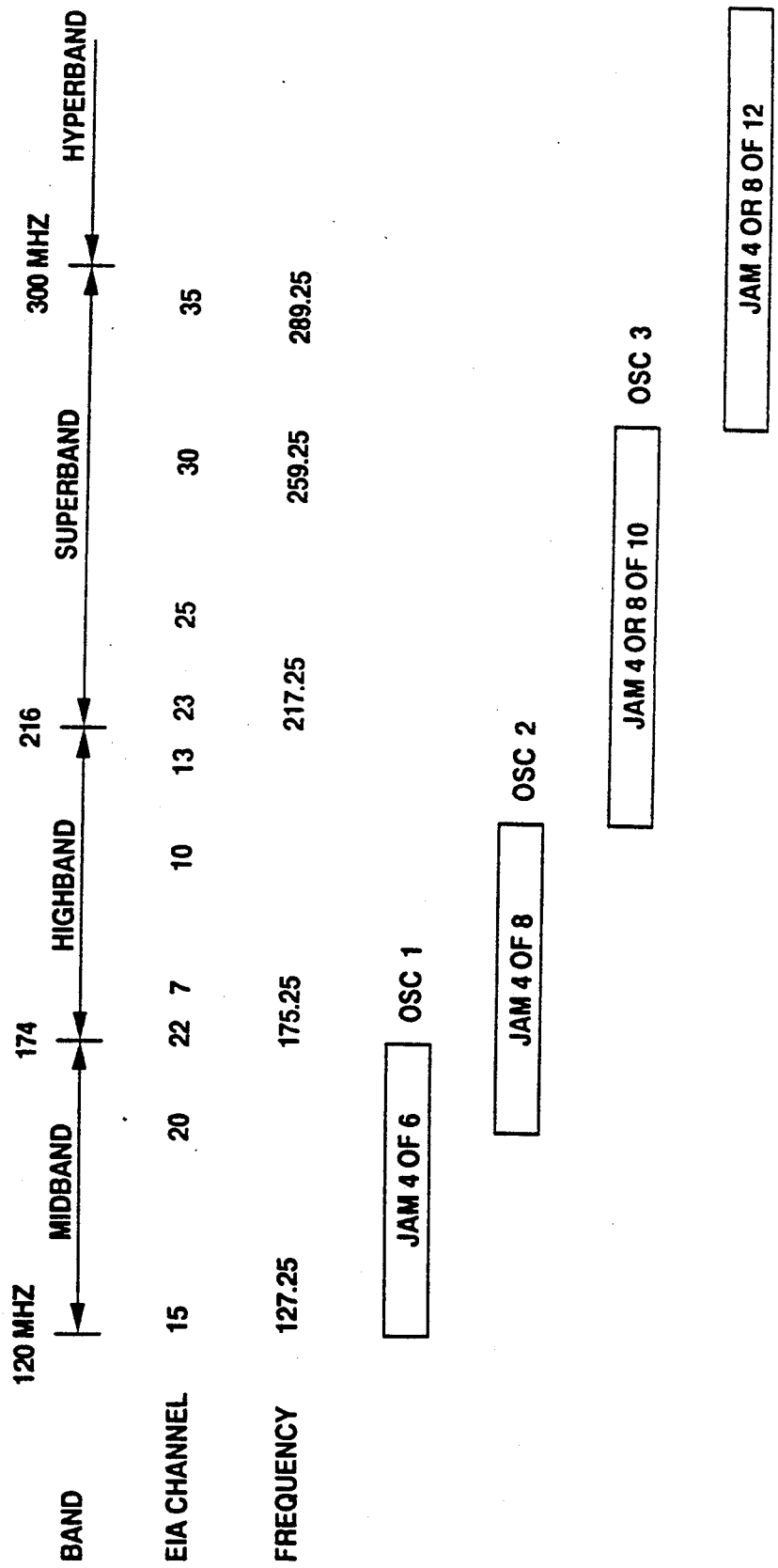
FIG. 4 shows frequency plans for allocating the broadband cable television spectrum among four or five separate bands, each of which bands comprising a plurality of channels greater than or equal to four but, of which plurality, only four channels may be jammed at a 20% jamming interval.

A directional coupler 210 which may be in the form of a plug-in module taps into the broadband serving cable 110. A broadband of radio frequency signals is thus output to highpass filter 220. Highpass filter 220 passes a band of frequencies comprising at least the data carrier frequency or frequencies (in a bidirectional application) and the cable television channel spectrum. Referring briefly to FIG. 4, the cable television spectrum may comprise a frequency band from about 54 MHz to 350 MHz.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits.

Also connected to directional coupler 232 is a data receiver 240 for receiving data from the addressable data transmitter 103 located at headend 100. Data receiver 240 receives data transmitted, for example, over a data carrier of 108.2 megahertz and provides unprocessed data to data decoder 250. In accordance with an established protocol, such data may be in the form of an operation code, a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in uninterruptable memory 270 by microprocessor 260. Data may be temporarily stored in memory 270 or more permanently stored and subsequently downloaded when needed to a subscriber module via a serial peripheral interface bus connecting microprocessor 260 with separate microprocessors associated with each provided subscriber module. Microprocessor 260 consequently interprets both global communications addressed to common control circuitry or communications addressed to unique subscriber modules. If appropriate, microprocessor 260 ignores global or addressed communications to other interdiction apparatus 130 or to converter/decoders 150 (FIG. 1). Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing the common control circuitry to deny or provide service to a particular subscriber.

If two way services over the serving cable are anticipated, a data transmitter (not shown) must be provided in the common control circuitry of FIG. 2 or a separate telephone link from the subscriber location to the headend may be provided. Serial peripheral interface bus 290 may be a two way communications link by way of which link microprocessors 300 (FIG. 3) associated with subscriber modules may, at least, provide status reports to microprocessor 260 upon inquiry.

Radio frequency splitter 280 provides broadband radio frequency signals comprising at least the cable television service spectrum of FIG. 4 separately to each subscriber module that is provided.

If a reverse path is required for special additional services, a signal combiner (not shown) of a plug-in special service module may be provided for receiving communications from each of the four subscriber modules in an opposite manner to splitter 280. Certain data may be transmitted back toward the headend via the special service plug-in module (also, not shown) associated with the additional special service.

Figure 3:
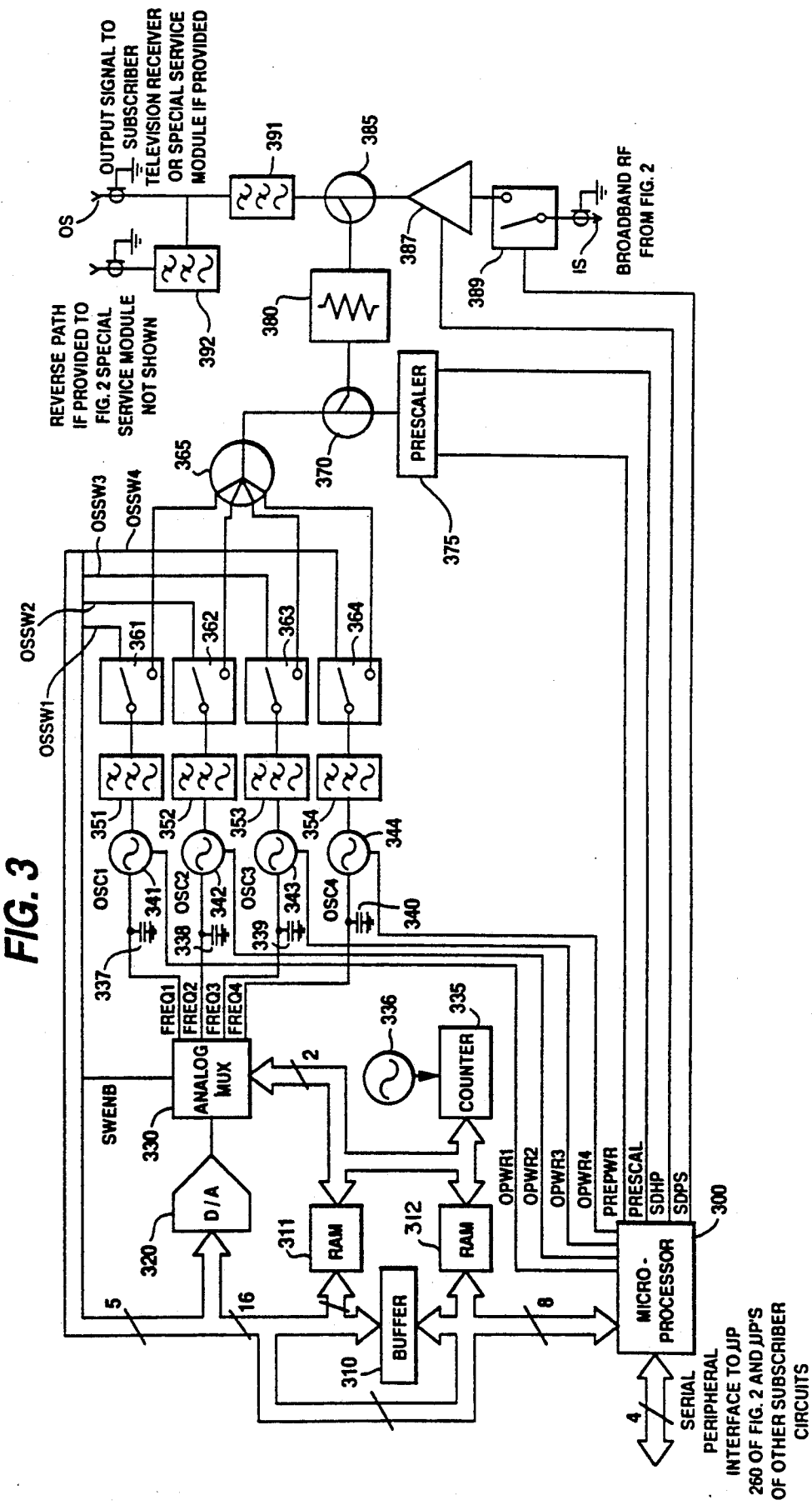
FIG. 3 is a block schematic diagram of one subscriber module comprising a microprocessor for selectively actuating and controlling the output frequency provided by at least one voltage controlled oscillator such that during a normal mode of operation up to sixteen premium channels may be jammed at a minimum twenty percent jamming interval and, during a calibration mode, a feedback path is provided to the microprocessor through a programmable prescaler to precisely establish jamming signal frequencies.

Referring more particularly to FIG. 3, there is shown an overall block schematic diagram of a subscriber module in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 300. Consequently, microprocessor 300 may conveniently comprise a Motorola 68HC05C3 microprocessor or similar unit.

A reverse path may be provided via a lowpass filter 392 to a special service module (not shown in FIG. 2) of common control circuitry as described in FIG. 2 from a corresponding special service module on the subscriber premises. Such a reverse path is completed to the subscriber via terminal OS. Also, power may be transmitted up the subscriber drop to the module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, an amplifier 387, a jamming signal combiner 385, and a high pass filter 391. Service denying switch 389 is under control of microprocessor 300. In the event of an addressed communication from headend 100 indicating, for example, that a subscriber is to be denied service for non-payment of a bill, service denying switch 389 may be opened. In addition, a high frequency amplifier 387 may be powered down under control of microprocessor 387 whenever service is to be denied. Otherwise, amplifier 387 may be set at discrete gain levels, under microprocessor control, to provide supplemental gain to the broadband television signal if a subscriber has a plurality of television receivers over and above a nominal amount.

Jamming signals are interdicted at directional combiner 385 under microprocessor control. Because of the directional characteristic of amplifier 387, jamming signals cannot inadvertently reach the common control circuitry of FIG. 2 or the serving cable 110. Jamming signals are preferably interdicted at a level approximately within a range of $-2.5$ db to $+6.5$ db or $+2$dB nominal of the video carrier power level of the unauthorized premium channel frequency to be jammed. For jamming the video carrier only, they are most conveniently interdicted approximately within a range of frequencies extending from 100 KHz below the video carrier to $+250$ kilohertz above the video carrier toward the audio carrier of the channel to be jammed. In according with the present interdiction apparatus, the jamming frequency is selectable by the headend 100 and may be chosen to jam both the video and audio carriers by setting it substantially equal to the sum of the video carrier frequency and a fraction $1/N$ of the difference between the video and audio carrier frequencies, if so desired. Interdiction on a per channel basis at such a frequency adequately jams both the video and audio carriers, yet minimizes adjacent channel artifacts or interference.

Highpass filter 391 prevents any return path signals from reaching combiner 385 and passes the broadband spectrum including any jamming signals toward terminal OS. Reverse path signals, for example in this embodiment, if present, may be radio frequency signals below 100 megahertz. The broadband television spectrum is presumed to be in the 100-350 megahertz range consistent with FIG. 4. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300 controls at least one and up to four (or five if necessary) voltage controlled oscillators 341-344, each of which oscillators jams premium channel frequencies within an allocated continuous range of frequencies. Since premium programming may be transmitted anywhere in the cable television spectrum, the sum of all such allocated portions comprises the entire television spectrum to be jammed (even where non-premium channels are normally transmitted). In accordance with the present invention, the television spectrum to be jammed may comprise discontinuous portions or intentionally overlapping portions.

Cable headend service providers tend to select premium channel allocations in the midband range covering channels 15-22. Consequently, the band of oscillator 342, for example, may be selected to overlap the band allocated to oscillator 341.

In order to achieve a jamming interval of 20%, each oscillator may be restricted to jamming only four premium channels. As will be described in connection with a discussion of FIGS. 5, 6, and 7, jamming depth may be automatically increased for a particular subscriber dependent upon the subscriber's level of service. Also, by allocating an overlap of bands as between first and second oscillators 341 and 342, for example, all eight channels of the midband may be jammed by means of the present interdiction apparatus leaving two channels of the highband which still may be jammed via oscillator 342. Consequently, according to FIG. 4, oscillator OSC1 may jam four of the six allocated channel frequencies of the midband while oscillator OSC2 may jam an overlapping band comprising channels 19-22 of the midband and channels 7-10 of the highband.

Consistent with these design principles, no band overlap is shown for oscillator OSC3 or oscillator OSC4. Nevertheless, the respective frequency ranges of 198-254 megahertz and 258-326 megahertz of these oscillators eliminate any danger of adjacent channel interference. Oscillator OSC3 provides jamming signals for jamming four premium channels selected from channels 11-13 of the highband and channels 23-29 of the superband. Eight premium channels may be jammed at a reduced jamming factor of these ten channels. Oscillator OSC4 is provided for jamming from channel 30 in the superband to channel 41 extending into the hyperband.

Additionally, a fifth oscillator may be desired to cover an additional band of normally non-premium channels such as lowband channels 2 through 6 from 54 MHz to 88 MHz. The lower frequency oscillator would be more limited as to the number of channels it could jam (4 of 4 channels) than the high frequency oscillator (4 to 13 of 13 channels). Alternatively, fewer oscillators can be used wherein only a few of the five portions illustrated in FIG. 4(b) are selected. In any event, more than five oscillators is also clearly possible covering additional portions beyond those in FIG. 4(b) up to about 600 MHz.

Microprocessor 300 is connected by a bus system to memory and buffer circuits comprising RAM's 311 and 312 and buffer 310. Microprocessor 300 operates at a clock frequency of, for example, four megahertz provided by clock 336. Counter 335 is shown as a separate element; however, counter335 is provided essentially counting the output frequencies of one or more jamming oscillators 341-344 during a frequency calibration mode of operation and so may comprise an element of microprocessor 300.

Microprocessor 300 is also connected to digital to analog converter 320. During a normal mode of operation, digital to analog converter 320 converts a ten bit voltage control word to analog voltage outputs which are, in turn, provided to analog multiplexer 330. The analog voltage outputs of the analog multiplexer 330 are stored and held at sample and hold circuits 337-340 for application to one or more oscillators 341-344. Via a two bit parallel select bus, analog voltage signal outputs are periodically gated by analog multiplexer 330 over leads FREQ1-4 toward the oscillators 341-344. In accordance with the principles of the present invention, these signals may be provided in a pseudorandom sequence to thwart pirating attempts as will be described in reference to FIG. 6.

Microprocessor 300 is connected to an oscillator or oscillators 341-344 via respective oscillator power lines OPWR1-4 for actuating the oscillator or oscillators. The oscillator or oscillators may be powered down during a normal mode of operation if a subscriber is authorized to receive all channels within its allocated band at one point in time. Furthermore, during a calibration mode, an oscillator may be powered up for calibration while any other oscillators are powered down.

Microprocessor 300 is further connected to four high frequency PIN diode switches 361-364. During a normal mode of operation, these switches are selectively opened for a brief interval for, for example, sixteen microseconds while the associated oscillator changes or hops from one jamming signal frequency output to another. Nevertheless, assuming four channel jamming by a particular oscillator at a jam factor of four, a four thousand hertz frequency hopping rate is easily achievable via these PIN diode switches.

The jamming signal outputs of the oscillator or oscillators are combined at signal combiner 365. From signal combiner 365, the combined output is directionally coupled by coupler 370 to programmable prescaler 375 and to signal attenuator 380.

Programmable prescaler 375 is only powered via lead PREPWR when required during a calibration mode. In accordance with a programmable divide-by factor, a divided down output frequency is provided to microprocessor 300 for counting. When powered down, no output signal results.

During a normal mode of operation, the combined jamming signal output of attenuator 380 are combined at directional coupler 385 with the passed incoming broadband television signal from the common control circuit of FIG. 2. As the subscriber is presumed to have paid their bill, switch 389 and amplifier 387 are assumed to be powered. As a result of the combining of jamming signals with the broadband spectrum (thus far transmitted in the clear), the subscriber will only receive in the clear premium or restricted programming which the subscriber is authorized to receive.

Figure 5:
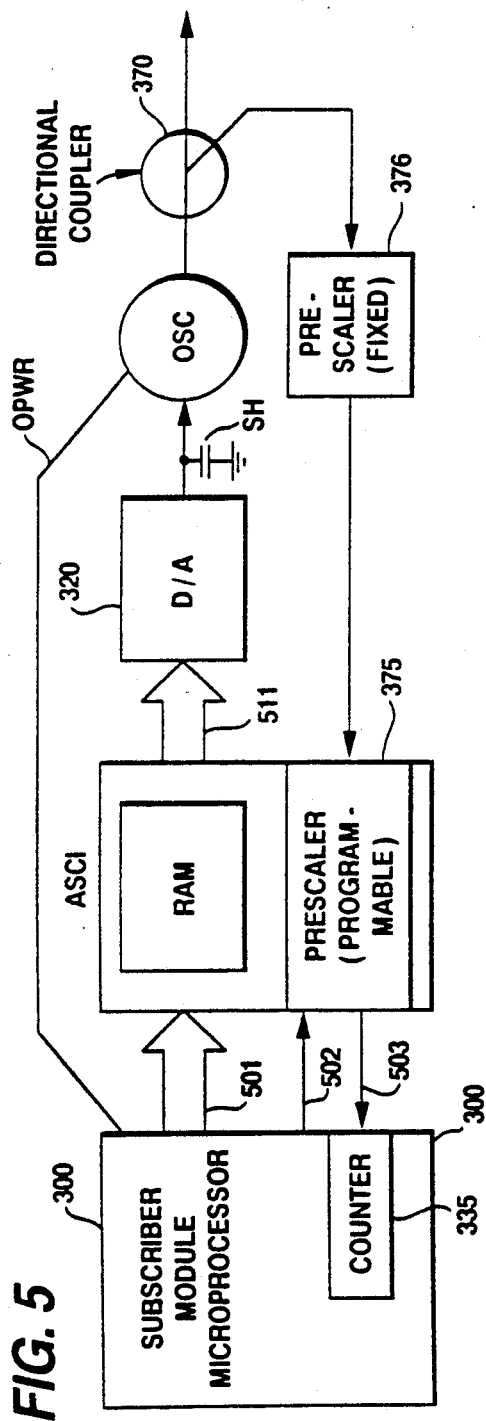
FIG. 5 is a detailed block schematic diagram of one embodiment of a feedback loop structure for implementing the frequency calibration mode of operation of the present invention.

Referring more particularly to FIG. 5, there is shown a block schematic diagram of one embodiment of a feedback loop useful in describing the frequency calibration mode of operation. The frequency calibration mode, occupying a fraction of a second, assures relatively stable operation during a normal mode of operation. Furthermore, because of the frequency calibration mode, there is no requirement for the application of slow conventional frequency locking techniques and a high operation frequency hopping rate of four thousand hertz may be achieved during the normal mode of operation. The embodiment shows the calibration of a particular oscillator OSC. The depicted loop indicates an application specific integrated circuit ASIC connected to subscriber module microprocessor 300. This circuit ASIC may be clocked at twice the microprocessor rate and comprise the previously discussed voltage control word memory RAM as well as programmable prescaler 375. A word adjust and select bus 501 is shown which may separately access and adjust all voltage control words in voltage control word memory RAM. When addressed, the voltage control word memory is connected via bus 511 to digital-to-analog converter 320. Digital-to-analog converter 320 is connected via sample and hold circuit SH to oscillator OSC to which power is applied under microprocessor control via lead OPWR. Via directional coupler 370, the jamming signal output of oscillator OSC is fed back toward microprocessor 300. At fixed prescaler 376, the high frequency output is divided down by a fixed divide-by factor. The divided down jamming frequency output is then output to programmable prescaler 375. Programmable prescaler 375 is under control of microprocessor 300. Responsive to premium channel frequency data transmitted from the headend to microprocessor 260 of FIG. 2, microprocessor 260 in turn generates divide by factor and time between count data for transmittal to microprocessor 300 via the serial peripheral interface bus (FIGS. 2 and 3). Microprocessor 300 programs the divide by factor of programmable prescaler 375 via lead 502 and receives a countable frequency output of programmable prescaler 375 via lead 503. Microprocessor 300 then counts the output at included counter 335.

The provision of application specific integrated circuit ASIC assists in miniaturizing the subscriber module of FIG. 3 and relieves the outboard memory requirements of microprocessor 300. On the other hand, the provision of a limited voltage control word memory in circuit ASIC may restrict the opportunity of microprocessor 300 to reallocate addressable slots to other oscillators when one oscillator is powered down as will be described in greater detail in reference to FIG. 6. The provision of a second or fixed prescaler in comparison with the single programmable prescaler shown in FIG. 3 is desirable if the frequency range of the television spectrum to be jammed extends into the hyperband.

Figure 6:
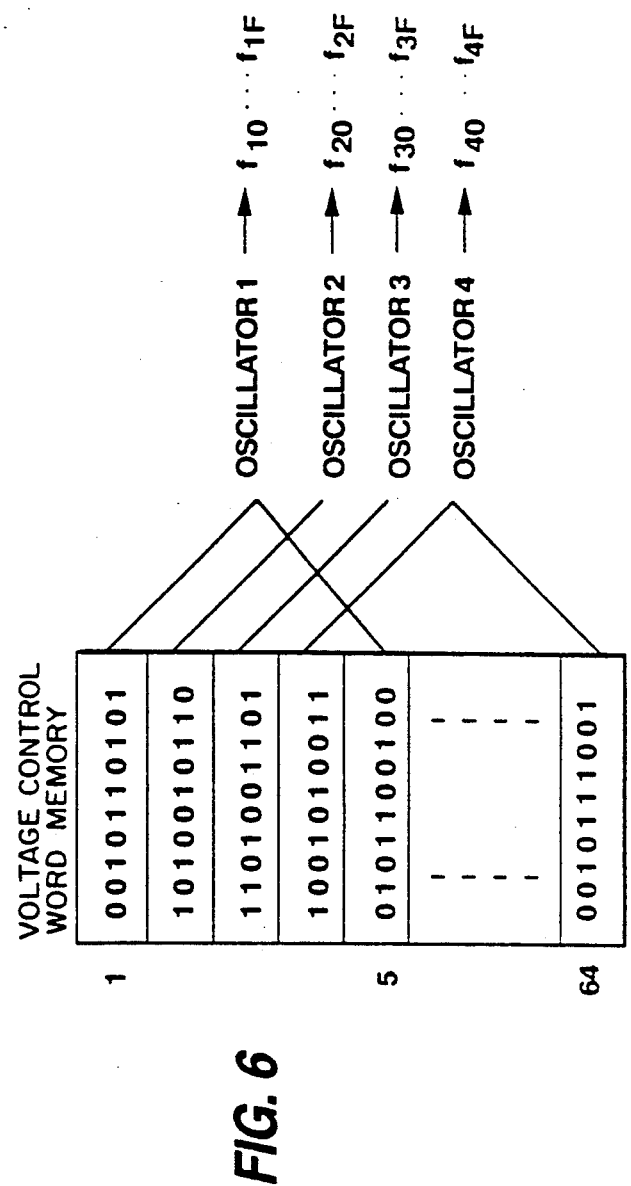
FIG. 6 is a block diagram of the voltage control word memory in connection with the sequential provision of oscillator jamming frequency signal outputs during a normal mode of operation.

Referring now to FIG. 6, there is shown one embodiment of a voltage control word memory having sixty-four memory locations (16 for each oscillator) with addresses b 1–64. At every fourth memory location 1, 5, 9 and so on is located a voltage control word associated with a first oscillator. For the convenience of establishing a convention for discussion, f 10 . . . $F_{IE}$ will be assumed to refer to sixteen frequency control words for a first oscillator OSC1 and are numbered in hexadecimal notation from O-F. As indicated above in reference to circuit ASIC memory requirements, the sixteen memory slots may be permanently associated with oscillator, OSC1; however, such a design choice limits the freedom of reallocating voltage control words to other oscillators.

Voltage control words are entered into voltage control word memory for each oscillator in sequence provided the oscillator will be applied for jamming. First, it will be assumed that four oscillators will be applied, each for jamming four premium channels. As will be seen, this is a simplified assumption which assumes a subscriber is authorized to receive no premium channels and, furthermore, it will be assumed that all premium channels may be jammed at the same jam factor four.

In this example, sixteen voltage control words will be entered in memory for each oscillator, four of which control words may be the same, each four similar control words being related to one premium channel frequency to be jammed. Thus, four groups of four similar control words are entered into sixteen memory locations 1, 5, 9, 13 . . . 61 for oscillator OSC1. These are indicated as $F_{10}$ to $F_{1F}$. In a similar manner, sixteen voltage control words are entered into memory locations 2, 6, 10, 14 . . . 62 for oscillator OSC2. These are indicated as $F_{20}$ . . . $F_{2E}$. Then, sixteen voltage control words are entered in memory locations 3, 7, 11, 15 . . . 63 for oscillator OSC3, indicated as $F_{30}$. . $F_{1F}$. Lastly, sixteen voltage control words are entered into memory locations 4, 8, 12, 16 . . . 64 for oscillator OSC4, indicated as $F_{40}$ . . . $F_{4F}$.

The calibration algorithm for loading a first ten bit voltage control word $F_{10}$ into a first memory location 1 for a first oscillator OSC1 will now be described in some detail. From the down-loaded frequency data from microprocessor 260, a first programmable divide-by factor is transmitted via lead 502 to set programmable prescaler 375. All other oscillators OSC2-4 are powered down via leads OPWR2-4, and oscillator OSC1 is powered up via lead OPWR1 (shown in FIG. 5 as oscillator OSC and lead OPWR respectively).

From the premium channel frequency data, a first ten bit voltage control word $F_{10}$ stored in memory location 1 representing a first best estimate of jamming frequency by microprocessor 300 via bus 501. The word is transmitted to digital-to-analog converter 320 where it is converted to an analog voltage. The analog multiplexer, (not shown in FIG. 5) selects a lead FREQ1 from the multiplexer to oscillator OSC1. Consequently, the analog voltage output of the digital to analog converter is provided to sample and hold circuit SH or 337 for application to oscillator OSC1. Signal combiner 365 (not shown in FIG. 5 for simplicity) only passes the jamming signal output from oscillator OSC1 to directional coupler 370 because all other oscillators OSC2-4 are powered down at this time. Via directional coupler 370, the jamming signal output is provided to fixed prescaler 376. Fixed prescaler 376 divides down the output frequency of the oscillator OSC1 to a first frequency. According to the divide by factor loaded into programmable prescaler 375, the first frequency output of fixed prescaler 376 is further divided down to a frequency which may be counted by counter 335 of microprocessor 300. Recognizing that the oscillator output frequency may be hundreds of megahertz and the clock for microprocessor 300 runs at only four megahertz, the frequency provided via lead 503 should be sufficiently divided down to the counted with reasonable accuracy. Since the fixed time between counts is known to microprocessor 300 having been downloaded from microprocessor 260, counter 335 counts the frequency input on lead 503. The resulting count is compared with the expected count and the microprocessor adjusts the control word accordingly. As a result, microprocessor 300 repeatedly enters the algorithm until the voltage control word stored in memory as accurately as possible reflects the premium channel frequency to be jammed.

Then, this process is repeated four times for four premium channel frequencies to be jammed by the oscillator OSC.

During the process of loading the four premium channel frequencies for a particular oscillator into the voltage control word memory, there are three subordinate schemes by which the four voltage control words for a single premium channel may be intentionally varied. In a first subordinate scheme, via headend 100, four different frequencies may be intentionally selected with references to one premium channel. Given a resolution of 50 kilohertz provided by the least significant bit positions of a ten bit voltage control word, the four different frequencies may be selected by headend 100 anywhere within the 250 kilohertz range above the premium channel video carrier for most effective premium channel jamming. In a second subordinate scheme microprocessor 300 may be programmed to intentionally vary the entered voltage control word to be at or about the expected downloaded frequency, for example, at fifty kilohertz about or below the expected frequency. Consequently, if the headend selects only one frequency for a first premium channel, for example, at 200 kilohertz above the video carrier, then voltage control words will be entered into memory equivalent to video carrier plus 150 kilohertz, 200 kilohertz and 250 kilohertz. In a third scheme, the jamming factor may be altered by jamming the same premium channel at different frequencies. If enhanced jamming of a particular channel is desired, the jamming factor may be selected at a high level, for instance, four, using a single oscillator. Of the four jamming intervals, one time slot may have a jamming signal near the video carrier frequency, another time slot having a frequency halfway ($N=2$) between the video and audio carriers, a third time slot having a frequency a third ($N=3$) of the way between the video and audio carriers, etc. This so-called "enhanced" signal jamming forces a potential pirate to be able to remove energy from a plurality of frequencies within the channel. In addition, the harmonics produced by jamming at a frequency $1/N$ (where N is an integer) between the video and audio carriers fall on the audio carrier frequency, insuring jamming of both video and audio signals even in modern televisions with synchronous detectors. All three subordinate schemes thwart pirates attempting to notch out the jamming signal frequency which is intentionally varied by these schemes.

Jamming factor is a term related to the loading of the sixteen voltage control words into voltage control word memory for a particular oscillator. A jamming f actor is selected for each premium channel and is globally transmitted from the headend. If four premium channels are to be jammed by each of four oscillators OSC1-4 and all are to be jammed at the same jamming interval, each has a jamming factor of four. If a subscriber subscribes to all four premium channels associated with oscillator OSC1, then oscillator OSC1 may be powered down and no voltage control words entered in memory during calibration for this oscillator. If a subscriber subscribes to two of the four channels, the microprocessor may allocate the sixteen control words for the first oscillator to the two unauthorized premium channel frequencies to be jammed. Consequently, the microprocessor may allocate eight control words each to jamming the two unauthorized premium channels thus automatically increasing the jamming interval or depth of jamming based on the jamming factor and the given reduced level of premium program authorization.

Jamming factor may be intentionally selected, for example, at a high level, for example, eight for one especially sensitive program in relation to two other channels to be jammed by the same oscillator which may be allocated jam factors of four each, the total of all such jam factors being equal to the maximum number of voltage control words, in this example, sixteen associated with the oscillator.

Voltage control words may be read from memory or written into memory so they may be read out in a particular pseudorandom or random sequence so that a pirate would have to know the pseudorandom or random sequence in order to appropriately time any notch filtering. For example, let $F_{11}-F_{14}$ be the four premium channel frequencies to be jammed by oscillator OSC1. Addresses 1, 5, 9, and 13 may store voltage control words for $F_{11}F_{12}$, $F_{13}$ and $F_{14}$, respectively. However, the next four addresses 17, 21, 25 and 29 may store t e voltage control words in a different order, for example, $F_{14}$, $F_{13}$ $F_{12}$, $F_{11}$ respectively. The order may be further varied in the remaining eight addresses so, when the voltage control words are applied to oscillator OSC1 during a normal mode of operation, the output frequency of the jamming signal will vary according to the pseudorandom or random sequence of data entry.

The subscriber module processor 300 of FIG. 5 may have a random or pseudo-random number generator to vary the order of the jamming signals. Alternately, the headend 100 of FIG. 1 may provide a random or pseudo-random signal to individual or groups of subscriber module processors to alter the order of the jamming signal on either, a periodic or dynamic basis. The effect of such a random or pseudorandom technique is to make piracy virtually impossible. In order to filter out the jamming signals, a pirate must provide for a series of notch filters for each of the premium channels not only at the video carrier, but also at the intervals $1/N$ between the video and audio carriers as well. The pirate would then also have to contend with the intentional or unintentional frequency drift of each of these oscillator frequencies, and be able to predict the random or pseudo-random order of the jamming frequencies.

The calibration mode is entered at initial turn-on to generate the sixty-four voltage control words for storage in voltage control word memory corresponding to the desired jamming signal frequencies. Periodically, the subscriber module reenters the calibration mode to update the control words for drift which may result from either the oscillator or the digital to analog converter operation. Such drift if maintained within, for example, 50 kilohertz of the selected frequency is actually desirable in that it further complicates the efforts of a would-be pirate. Also, as already indicated the periodically performed calibration mode permits a higher rate of frequency hopping, for example, four kilohertz during normal operation than would be possible with conventional frequency control methods such as phase locked loops. Calibration requires but a fraction of a second and, consequently, no intelligible television information may be obtained at a television receiver tuned to a unauthorized premium channel.

Figure 7:
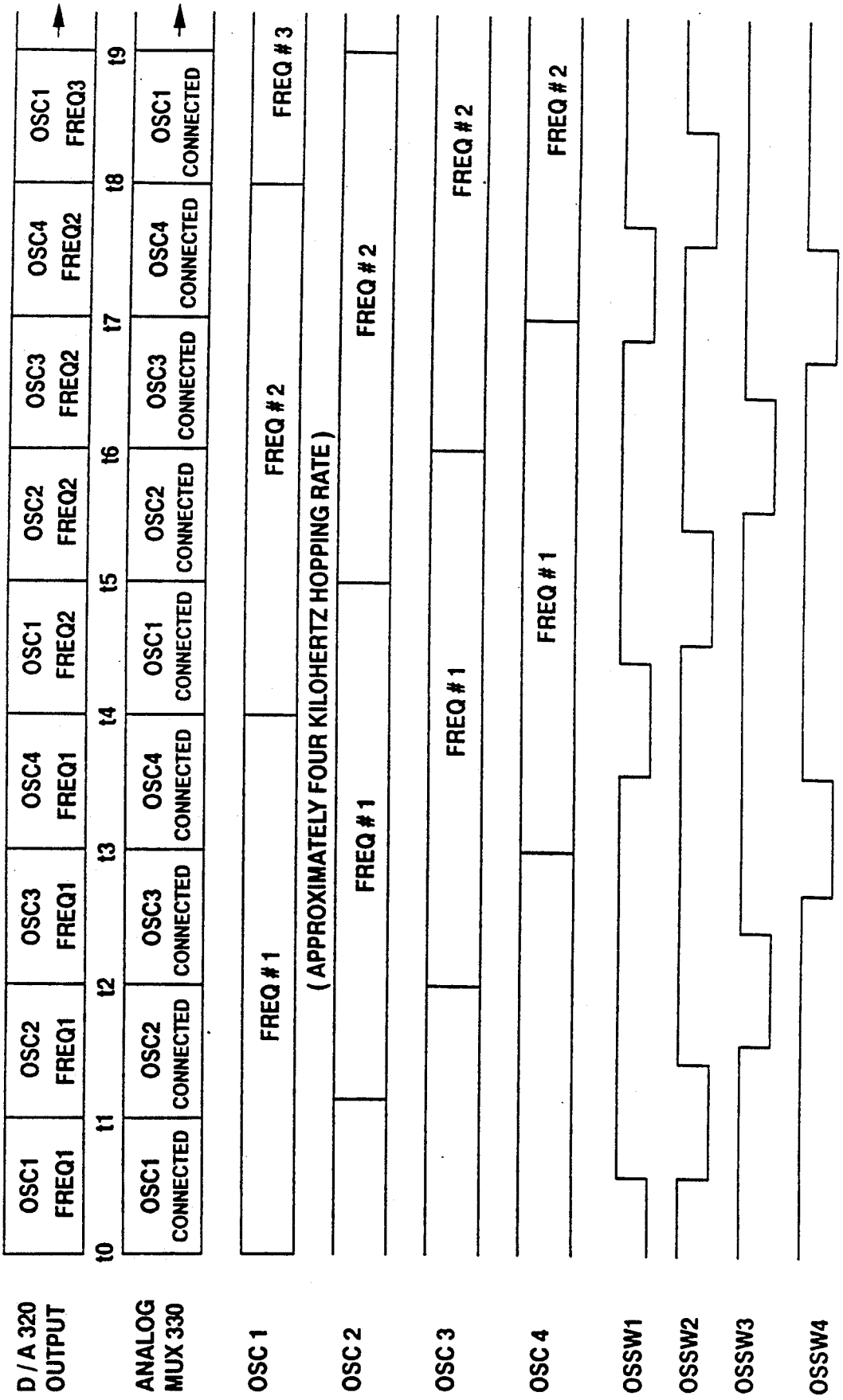
FIG. 7 is a timing diagram for the embodiment of FIG. 3 during a normal mode of operation in which each interdiction control signal is particularly depicted.

Referring now more particularly to FIGS. 6 and 7 with reference to the schematic block diagram of FIG. 3, the normal mode of operation will now be explained. Referring first to FIG. 3, microprocessor 300 upon entering a normal mode of operation causes a first voltage control word stored in memory address 1 of the voltage control word memory of FIG. 6 to be transmitted toward oscillator OSC1. Digital to analog converter 320 converts the ten bit word 0010110101 to an analog voltage level. Under control of a two bit select bus, analog multiplexer 330 selects lead FREQ1 for transmitting the analog voltage signal for storage and holding at sample and hold circuit 337. All four oscillators are presumed to be powered for this example under control of microprocessor 300 via leads OPWR1-4. Consequently, powered-up oscillator OSC1 provides a jamming signal frequency output FREQ2 consistent with the analog voltage signal input provided via analog multiplexer 330.

Referring to FIG. 7, the normal mode of operation for the example under discussion is shown in the form of a timing diagram. At the output of the digital to analog converter is shown at time t0 an analog voltage level representing frequency FREQ1 for oscillator OSC1. Also, during time interval t0-t1, the analog multiplexer 330 is shown connecting the digital to analog converter 320 to oscillator OSC1. While the analog multiplexer is only connected to oscillator OSC1 for the duration t0-t1, the applied analog voltage is stored and held for the duration t0-t4. Consequently, the output of oscillator OSC I is shown continuously applied from time t0-t4.

Under control of microprocessor 300 via lead OSSW1, switch 361 is briefly opened while frequency FREQ1 is established at the output of oscillator OSC1 and then immediately closed. Switch 361 stays closed for the duration until the output of oscillator OSC1 hops from frequency FREQ1 to FREQ2. Just prior to time t4, switch 361 is again opened in accordance with signal OSSW1. Consequently at the output of switch 361, the jamming signal output of oscillator 341 is briefly interrupted.

At time t4, the digital to analog converter 320 is signaled to change the output frequency of oscillator OSC1 to frequency FREQ2. As before, the analog multiplexer 330 gates an analog voltage level, this time representing frequency FREQ2 to be held at sample and hold circuit 337. As a result, oscillator OSC2 now provides a jamming signal frequency output consistent with frequency FREQ2 until time t8.

Meanwhile, switch 361 which was opened shortly before time t4 in accordance with switch control signal OSSW1 is again closed at a point in time shortly after time t4. At any point in time during a normal mode of operation when one of the high frequency switches 361-364 is opened, there will result a loss of a portion of the overall jamming interval during which a jamming signal would be applied. Nevertheless, the resulting danger of the presence of no switches 361-364 is that during a hopping from one frequency to the next, an undesirable transition signal may result at a frequency and level which may distort authorized premium programming. If four premium program channel frequencies are to be jammed by a particular oscillator, each such period of an open state of a normally closed high frequency switch 361-364 amounts to no more than 5% of the overall interval t0-t64 (not shown).

In a similar manner, a first frequency FREQ1 is established for oscillator OSC2. Referring again to FIG. 6, it will be seen that at memory address 2 is voltage control word 1010010110 which is provided toward oscillator OSC2. In accordance with FIG. 7, at time t1 an analog voltage level is output from digital to analog converter 320 representing this word. At a time just prior to time t1, switch 362 is opened in accordance with signal OSSW2. Once frequency FREQ1 is established at the output of oscillator OSC2 or at a time just after time t1, switch 362 is again closed in accordance with signal OSSW2 provided by microprocessor 300.

As the normal mode of operation continues, all sixty-four memory locations shown in FIG. 6 are periodically addressed and provided for operating oscillators OSC-1-4. In accordance with FIG. 7, only the first seven words are represented as having been provided for selecting the first three frequencies for oscillator OSC1 and two frequencies each for oscillators OSC2-4; however, the process for controlling all sixteen frequencies for each oscillator may follow in the sequence shown or intentionally vary.

In an alternative embodiment, a single broad-band oscillator may be used in place of the four narrow-band oscillators shown in FIG. 3 to cover the entire cable television frequency spectrum. Alternately, a single oscillator covering only a portion of the spectrum may be used. In the latter embodiment, the premium channels capable of being jammed would have to be assigned within the frequency spectrum of the oscillator. Similarly, two or more oscillators could also be used to cover either, paint or all of the cable television spectrum.

In order to thwart pirates and referring to FIG. 7 for oscillator OSC1, it may be seen how frequencies may be output in a random or pseudorandom sequence. Output frequencies FREQ1, FREQ2, FREQ3, FREQ4 are shown output in intervals t0-t4, t4-t8, t8-t12, and inferentially, t12-t16 respectively. In the next intervals, the frequencies may be provided, instead, in the sequence FREQ4, FREQ3, FREQ2, and FREQ1. Then, in the next successive intervals the frequencies may be provided in yet a third different sequence, for example, FREQ2, FREQ3, FREQ4, FREQ1. During the last four successive intervals extending from t48 to t64, the order of applied frequencies may be altered again, for example, FREQ3, FREQ4, FREQ1, FREQ2. The random or pseudorandom sequence may be defined and downloaded from the headend or developed internally by either microprocessor 260 of FIG. 2 or microprocessor 300 of FIG. 3.

Additionally, the above disclosed interdiction method and apparatus is not limited to jamming premium channel transmissions over coaxial cable. Interdiction of transmission over alternative mediums to coaxial cable such as fiber optic cable or over-the-air radio frequency transmission can easily be accomplished. This is especially possible for those fiber optic cable television arrangements operating over approximately the same RF television bands as conventional coaxial cable CATV distribution systems.

What is claimed is:

1. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for selectively generating a first jamming signal having a frequency within at least a portion of said broadband cable television spectrum substantially equal to the sum of a video carrier frequency with in said spectrum and a fraction 1/N of the difference between said video carrier frequency and said audio carrier frequency associated with said video carrier where N is an integer greater than one and less than ten; and means for interdicting said first jamming signal into said programming to prevent unauthorized reception of the audio and video signals of the programming.

2. The interdiction apparatus of claim 1 wherein said at least one oscillator means is a frequency agile oscillator.

3. The interdiction apparatus of claim 2 further comprising:

control means, operatively coupled to said at least one oscillator means for selectively controlling the frequency of said first jamming signal of said at least one oscillator means for a selected interval of a jamming cycle.

4. The interdiction apparatus of claim 3, wherein said control means further comprises:

communication means, for communicating with a cable television headend and receiving signals for selecting the frequency of said first jamming signal.

5. The interdiction apparatus of claims 3 or 4, wherein said jamming cycle comprises at least a first interval and a second interval.

6. The interdiction apparatus of claim 5, wherein said control means selects a first jamming signal carrier frequency for said first interval and selects a second jamming signal carrier frequency for said second interval wherein said first jamming signal carrier frequency is unequal to said second jamming signal carrier frequency.

7. The interdiction apparatus of claim 6, wherein said second jamming carrier frequency is within a frequency range which also includes said video carrier frequency.

8. The interdiction apparatus of claim 7 wherein said frequency range extends from 100 kHz below said video carrier frequency to 250 kHz above said video carrier frequency.

9. The interdiction apparatus of claim 5, wherein said jamming cycle is longer than the sum of said first interval and said second interval.

10. The interdiction apparatus of claim 5, wherein said control means further controls the length of each of said intervals.

11. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for sequentially generating a plurality of jamming signal carriers at different frequencies within at least a portion of said broadband cable television spectrum, and control means, operatively coupled to said at least one oscillator means for selectively controlling said jamming signal carrier frequencies of said at least one oscillator means for at least a first and second interval of a jamming cycle, said control means selecting said jamming signal carrier frequency during said first interval to be at a frequency within a range including a video carrier frequency of a cable television channel, and selecting said jamming signal carrier frequency during said second interval to be substantially equal to the sum of said video carrier frequency and a fraction 1/N of the difference between said video carrier frequency and an audio carrier frequency of said cable television channel, where N is an integer, greater than one and less than ten; and means for interdicting said jamming said carriers into said programming to prevent unauthorized reception of the video and audio signals of the programming.

12. The interdiction apparatus of claim 11, wherein said control means further comprises:

communication means, for communicating with a cable television headend and receiving signals for selecting said jamming signal carrier frequency.

13. The interdiction apparatus of claim 11 or 12, wherein said jamming cycle is longer than the sum of said first interval and said second interval.

14. The interdiction apparatus of claim 13, wherein said control means further controls the length of each of said first and second intervals.

15. The interdiction apparatus of claim 18, wherein said range extends from 100 kiloHertz below said video carrier frequency to 250 kiloHertz above said video carrier frequency.

16. A method of selectively jamming programming comprising video signals and associated audio signals transmitted to a subscriber in a cable television system comprising the steps of:

generating at least one jamming signal having a jamming signal carrier frequency substantially equal to the sum of a video carrier frequency and a fraction 1/N of the difference between said video carrier frequency and an associated audio carrier frequency of a cable television channel, wherein N is an integer greater than one and less than ten, combining said jamming signal carrier with at least a portion of a broadband cable television spectrum to produce a combined signal, and transmitting said combined signal to said subscriber to prevent unauthorized reception of said audio and video signals.

17. The method of claim 16, wherein said step of combining further comprises:

combining said jamming signal carrier with at least a portion of a broadband cable television spectrum for at least one interval of a jamming cycle to produce a combined signal.

18. The method of claim 17, wherein said step of combining further comprises step of:

receiving a communication from a cable television headend for selecting said jamming signal carrier frequency.

19. The method of claim 17, wherein said step of combining further comprises the step of:

combining said jamming signal carrier with at least a portion of a broadband cable television spectrum for at least a first interval and combining a second jamming signal carrier with at least a portion of a broadband cable television spectrum for at least a second interval, wherein said jamming signal carrier frequency is unequal to said second jamming signal carrier frequency.

20. The method of claim 19, wherein said step of combining further comprises the steps of:

controlling the length of said first interval and said second interval in a random manner.

21. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for sequentially generating a plurality of jamming signal carriers at different frequencies within at least a portion of said broadband cable television spectrum, and control means, operatively coupled to said at least one oscillator means for selectively controlling said jamming signal carrier frequencies of said at least one oscillator means for at least a first and second interval of a jamming cycle, said control means selecting said jamming signal carrier frequency during said first interval to be at a frequency within a range including a video carrier frequency of a cable television channel and selecting said jamming signal carrier frequency during said second interval to be substantially equal to the sum of said video carrier frequency and a fraction 1/N of the difference between said video carrier frequency and an audio carrier frequency of said cable television channel, where N is an integer greater than one and less than ten, said control means further controlling the order of said first and second jamming intervals in said jamming cycle in a random manner; and means for interdicting said jamming signal carriers into said programming to prevent unauthorized reception of the video and audio signals of the programming.

22. The interdiction apparatus of claim 21, wherein said control means further comprises:

communication means for communicating with a cable television headend and receiving signals for selecting said jamming signal carrier frequency.

23. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for sequentially generating a plurality of jamming signal carriers at different frequencies within at least a portion of said broadband cable television spectrum, and control means, operatively coupled to said at least one oscillator means for selectively controlling said jamming signal carrier frequencies of said at least one oscillator means for at least a first and second interval of a jamming cycle, said control means selecting said jamming signal carrier frequency during said first interval to be at a frequency within a range including a video carrier frequency of a cable television channel and selecting said jamming signal carrier frequency during said second interval to be substantially equal to the sum of said video carrier frequency and a fraction 1/N of the difference between said video carrier frequency and an audio carrier frequency of said cable television channel, where N is an integer greater than one and less than ten, said control means further controlling the order of said first and second jamming intervals in said jamming cycle in a pseudorandom manner; and means for interdicting said jamming signal carriers into said programming to prevent unauthorized reception of the video and audio signals of the programming.

24. The interdiction apparatus of claim 23, wherein said control means further comprises:

communication means for communicating with a cable television headend and receiving signals for selecting said jamming signal carrier frequency.

25. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for sequentially generating a plurality of jamming signal carriers at different frequencies within at least a portion of said broadband cable television spectrum, and control means, operatively coupled to said at least one oscillator means for selectively controlling said jamming signal carrier frequencies of said at least one oscillator means for at least a first and second interval of a jamming cycle, said control means selecting said jamming signal carrier frequency during said first interval to be at a frequency within a range including a video carrier frequency of a cable television channel and selecting said jamming signal carrier frequency during said second interval to be substantially equal to the sum of said video carrier frequency a fraction 1/N of the difference between said video carrier frequency and an audio carrier frequency of said cable television channel, where N is an integer greater than one and less than ten, said control means further controlling the length of each of said first and second intervals in a random manner; and means for interdicting said jamming signal carriers into said programming to prevent unauthorized reception of the video and audio signals of the programming.

26. The interdiction apparatus of claim 25, wherein said control means further comprises:

communication means for communicating with a cable television headend and receiving signals for selecting said jamming signal carrier frequency.

27. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one oscillator means for sequentially generating a plurality of jamming signal carriers at different frequencies with at least a portion of said broadband cable television spectrum, and control means, operatively coupled to said at least one oscillator means for selectively controlling said jamming signal carrier frequencies of said at least one oscillator means for at least a first and second interval of a jamming cycle, said control means selecting said jamming signal carrier frequency during said first interval to be at a frequency within a range including a video carrier frequency of a cable television channel and selecting said jamming signal carrier frequency during said second interval to be substantially equal to the sum of said video carrier frequency and a fraction 1/N of the difference between said video carrier frequency and an audio carrier frequency of said cable television channel, where N is an integer greater than one and less than ten, said control means further controlling the length of each of said first and second intervals in a pseudorandom manner; and means for interdicting said jamming signal carriers into said programming to prevent unauthorized reception of the video and audio signals of the programming.

28. The interdiction apparatus of claim 27, wherein said control means further comprises:

communication means for communicating with a cable television headend and receiving signals for selecting said jamming signal carrier frequency.

29. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one frequency agile oscillator means for selectively generating a first jamming signal having a frequency within at least a portion of said broadband cable television spectrum substantially equal to the sum of a video carrier frequency within said spectrum and a fraction 1/N of the difference between said video carrier frequency and said audio carrier frequency associated with said video carrier where N is an integer greater than one and less than ten;

control means, operatively coupled to said at least one oscillator means for selectively controlling the frequency of said first jamming signal of said at least one oscillator means for a selected interval of a jamming cycle comprising at least a first interval and a second interval, said control means further controlling the order of said first and second jamming intervals in said jamming cycle in a random manner; and means for interdicting said first jamming signal into said programming to prevent unauthorized reception of the audio and video signals of the programming.

30. The interdiction apparatus of claim 29, wherein said control means further comprises:

communication means for communicating with a cable television headend and receiving signals for selecting the frequency of said first jamming signal.

31. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one frequency agile oscillator means for selectively generating a first jamming signal having a frequency within at least a portion of said broadband cable television spectrum substantially equal to the sum of a video carrier frequency within said spectrum and a fraction 1/N of the difference between said video carrier frequency and said audio carrier frequency associated with said video carrier where N is an integer greater than one and less than ten;

control means, operatively coupled to said at least one oscillator means for selectively controlling the frequency of said first jamming signal of said at least one oscillator means for a selected interval of a jamming cycle comprising at least a first interval and a second interval, said control means further controlling the order of said first and second intervals in said jamming cycle in a pseudorandom manner; and means for interdicting said first jamming signal into said programming to prevent unauthorized reception of the audio and video signals of the programming.

32. The interdiction apparatus of claim 30, wherein said control means further comprises:

communication means for communicating with a cable television headend and receiving signals for selecting the frequency of said first jamming signal.

33. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one frequency agile oscillator means for selectively generating a first jamming signal having a frequency within at least a portion of said broadband cable television spectrum substantially equal to the sum of a video carrier frequency within said spectrum and a fraction 1/N of the difference between said video carrier frequency and said audio carrier frequency associated with said video carrier where N is an integer greater than one and less than ten;

control means, operatively coupled to said at least one oscillator means for selectively controlling the frequency of said first jamming signal of said at least one oscillator means for a selected interval of a jamming cycle comprising at least a first interval and a second interval, said control means further controlling the length of each of said first and second intervals in a random manner; and means for interdicting said first jamming signal into said programming to prevent unauthorized reception of the audio and video signals of the programming.

34. The interdiction apparatus of claim 33, wherein said control means further comprises:

communication means for communicating with a cable television headend and receiving signals for selecting the frequency of said first jamming signal.

35. A cable television interdiction apparatus for selectively jamming programming transmitted to a subscriber over at least a portion of a broadband cable television spectrum wherein said programming comprises video signals having a video carrier frequency and associated audio signals having an audio carrier frequency, said apparatus comprising:

at least one frequency agile oscillator means for selectively generating a first jamming signal having a frequency within at least a portion of said broadband cable television spectrum substantially equal to the sum of a video carrier frequency within said spectrum and a fraction 1/N of the difference between said video carrier frequency and said audio carrier frequency associated with said video carrier where N is an integer greater than one and less than ten;

control means, operatively coupled to said at least one oscillator means for selectively controlling the frequency of said first jamming signal of said at least one oscillator means for a selected interval of a jamming cycle comprising at least a first interval and a second interval, said control means further controlling the length of each of said first and second intervals in a pseudorandom manner; and means for interdicting said first jamming signal into said programming to prevent unauthorized reception of the audio and video signals of the programming.

36. The interdiction apparatus of claim 35, wherein said control means further comprises:

communication means for communicating with a cable television headend and receiving signals for selecting the frequency of said first jamming signal.

* * * * *